(12) United States Patent
Kujala

(10) Patent No.: US 6,826,385 B2
(45) Date of Patent: Nov. 30, 2004

(54) METHOD AND SYSTEM FOR DISTRIBUTING GEOGRAPHICAL ADDRESSES ACROSS THE SURFACE OF THE EARTH

(75) Inventor: Jouni Kujala, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/081,511

(22) Filed: Feb. 22, 2002

(65) Prior Publication Data

US 2003/0162548 A1 Aug. 28, 2003

(51) Int. Cl.[7] .............................. H04B 7/85; H04Q 7/20; G08B 23/00; G01S 1/00; H04M 3/42
(52) U.S. Cl. ................... 455/13.1; 455/422.1; 455/428; 455/456.3; 340/573.1; 342/350; 342/457; 379/201.06; 701/207
(58) Field of Search ............................. 455/456.3, 13.1, 455/422, 428, 422.1; 342/350, 457; 340/573.1; 379/201.06; 701/207

(56) References Cited

U.S. PATENT DOCUMENTS

| | | | | |
|---|---|---|---|---|
| 5,592,172 | A | * | 1/1997 | Bailey et al. ................ 342/350 |
| 5,742,233 | A | | 4/1998 | Hoffman et al. ............. 340/573 |
| 5,802,468 | A | * | 9/1998 | Gallant et al. ............... 455/422 |
| 5,844,522 | A | * | 12/1998 | Sheffer et al. ............... 342/457 |
| 5,846,618 | A | * | 12/1998 | Weder et al. ................ 455/428 |
| 6,026,305 | A | * | 2/2000 | Salinger et al. .......... 455/456.3 |
| 6,067,502 | A | | 5/2000 | Hayashida et al. .......... 701/209 |
| 6,236,652 | B1 | | 5/2001 | Preston et al. ............... 370/349 |
| 6,236,834 | B1 | * | 5/2001 | Poskett et al. ............. 455/13.1 |
| 6,298,053 | B1 | | 10/2001 | Flammer, III et al. ....... 370/349 |
| 6,363,320 | B1 | * | 3/2002 | Chou .......................... 701/207 |
| 2001/0048364 | A1 | * | 12/2001 | Kalthoff et al. .......... 340/573.1 |
| 2003/0016804 | A1 | * | 1/2003 | Sheba et al. ............ 379/201.06 |
| 2003/0162548 | A1 | * | 8/2003 | Kujala ......................... 455/456 |

OTHER PUBLICATIONS

Davis et al., "A Means for Expressing Location Information In The Domain Name System", *RFC 1876 Network Working Group*, Jan. 1996, pp. 1–16.

Yliantila et al., "Review And Analytical Comparison Of The State–Of–The–Art Location–Aware Ad Hoc Routing Protocols", *University of Oulu*, Dec. 14, 2001, pp. 1–43.

* cited by examiner

*Primary Examiner*—William Cumming
(74) *Attorney, Agent, or Firm*—John W. Branch; Darby & Darby PC

(57) ABSTRACT

A method and system for increasing the number of geographical addresses for mobile devices in regions of the Earth nearer to the equator than those regions closer to the North and South poles and without significantly increasing the size (number of bits) of the addresses is provided. Typically, regions nearer to the equator have higher populations and a greater need for large amounts of geographical addresses than those regions found closer to the South and North poles. By using the sine of a latitude coordinate for a particular location instead of the actual latitude coordinate, the range of available geographical addresses for mobile devices in the most densely populated regions on Earth can be significantly increased while decreasing the number of addresses available in regions closer to the South or North poles.

18 Claims, 7 Drawing Sheets

$$\text{latitude bits} = (2^x - 1) / \sin(\text{latitude})$$

Fig. 6

$$\text{latitude} = \sin^{-1}\left(\frac{2^x - 1}{\text{latitude bits}}\right)$$

Fig. 7

| Latitude | Resolution with Sine of Latitudes | | Resolution with Latitudes | |
|---|---|---|---|---|
| | Latitude | Longitude | Latitude | Longitude |
| 0° =equator | 12 mm | 19 mm | 19 mm | 19 mm |
| 10° | 12 mm | 19 mm | 19 mm | 19 mm |
| 20° | 13 mm | 18 mm | 19 mm | 18 mm |
| 30° | 14 mm | 17 mm | 19 mm | 17 mm |
| 40° | 16 mm | 15 mm | 19 mm | 15 mm |
| 50° | 19 mm | 12 mm | 19 mm | 12 mm |
| 60° | 24 mm | 10 mm | 19 mm | 10 mm |
| 70° | 36 mm | 7 mm | 19 mm | 7 mm |
| 80° | 70 mm | 3 mm | 19 mm | 3 mm |

Fig.8

| HEMISPHERE | LATITUDE | LONGITUDE |
|---|---|---|

Fig.9

METHOD AND SYSTEM FOR DISTRIBUTING GEOGRAPHICAL ADDRESSES ACROSS THE SURFACE OF THE EARTH

FIELD OF THE INVENTION

The present invention is generally directed to mobile communications, and more particularly to increasing the number of available geographical addresses in regions of the Earth that are closer to the equator than the South or North poles.

BACKGROUND OF THE INVENTION

When geographical addresses are used in a network to identify and route communications, a unique geographical address for each device typically includes each device's latitude and longitude coordinates in a discrete number of bits. However, since longitudinal lines are closer to each other the nearer they get to the North or South poles of the Earth, the number of available geographical addresses based on the latitude and longitude coordinates of the physical locations of devices are more concentrated in regions nearer to the North and South poles. As a result, fewer geographical addresses are available in the more highly populated regions of the Earth, which tend to be closer to the equator than near the North or South poles.

However, the number of bits for geographical addresses can be increased to include more bits for resolving latitude and longitude coordinates within each region. The higher resolution of the larger geographical addresses makes more addresses available for every region on the Earth, including those regions closer to the equator. However, increasing the total number of larger geographical addresses that are available in every region on the Earth does not correct the problem of having a higher concentration of these addresses in regions nearer to the North and South poles.

By increasing the size (number of bits) of the geographical address, a greater amount of network resources is consumed when the addresses are employed in the packets sent over the network. In wireless networks, where every packet is at least partially routed based on the location of each packet's destination, typically at least one geographical address is present in every packet header. Minimizing the size of the geographical address and therefore also the sizes of the packet headers aims in maximizing the efficiency by saving the network capacity for the actual data to be transferred. Therefore, it would be useful to increase the number of geographical addresses for regions that are closer to the equator of the Earth than the North or South poles, and in doing so, not significantly increase the number of bits in the geographical addresses. Also, in some cases the length of the address field may be already fixed and therefore increasing the number of addresses for certain areas is not possible by increasing the total number of bits in the addresses.

SUMMARY OF THE INVENTION

The present invention is directed at addressing the above-mentioned shortcomings, disadvantages and problems, and will be understood by reading and studying the following specification.

According to one aspect of the invention, a method is provided for generating geographical addresses for mobile devices disposed on the surface of the Earth. At least a latitude coordinate and a longitude coordinate for a geographical position of a mobile device is determined. Also, another coordinate that corresponds to the latitude coordinate of the mobile device is determined. The determination of the other coordinate increases the number of latitude coordinates that are determinable for the mobile device in at least one region of the Earth. A geographical address for the mobile device is generated that includes the other coordinate and the longitude coordinate. By including the determined other coordinate and the longitude coordinate in each geographical address, substantially more geographical addresses can be generated for each mobile device disposed in at least one region of the Earth than a different geographical address of relatively the same size that includes the latitude coordinate and the longitude coordinate of the mobile device.

In accordance with another aspect of the invention, an altitude coordinate is determined for the geographical position of the mobile device. The altitude coordinate is also used to generate the geographical address of the mobile device. Additionally, the determination of at least the latitude coordinate and the longitude coordinate employs at least one of AGPS, GPS and triangulation.

In accordance with yet another aspect of the invention, the other coordinate is determined from the result of performing a sine function on the latitude coordinate. Additionally, the other coordinate can be determined with at least one equation, including latitudebits=$(2^x-1)$/sin(latitude). Where x represents the number of bits reserved for the determined sine of the latitude coordinate in the geographical address, latitudebits represents the other coordinate and latitude represents the latitude coordinate.

In accordance with still another aspect of the invention, the determination of the other coordinate includes accessing a table of other coordinates that are predetermined and correspond to latitude coordinates. Each predetermined other coordinate corresponds to each longitude coordinate that is determinable in at least one region of the Earth. Additionally, employing the other coordinate in the geographical address causes relatively more geographical addresses to be generated for each mobile device disposed in at least one region located nearer to the equator of the Earth than another region located closer to the South Pole or yet another region located closer to the North Pole.

In accordance with the invention, the geographical address for the mobile device and another geographical address for another mobile device is employed to establish communication and enable the routing of packets between the location of the mobile device and another location of the other mobile device over a network. Also, each mobile device on the network can forward a request for communication between the mobile device and the other mobile device along a path that includes at least one other mobile device on the network. Additionally, at least one geographical address of at least one other mobile device is employed to determine the path between the mobile device and the other mobile device. Furthermore, communication is established between the mobile device and the other mobile device by at least one other mobile device operating as a router disposed on the path between the mobile device and the other mobile device.

In accordance with the invention, geographical addresses of each mobile device are stored in a data store. The data store may be disposed in at least one mobile device. Also, the data store may be disposed in at least one server accessible through a base station in communication with at least one mobile device on the network.

According to other embodiments of the invention, a system may be provided for generating geographical addresses for mobile devices disposed on the surface of the Earth in substantially the same manner as the method discussed both above and below.

BRIEF DESCRIPTION OF THE DRAWINGS

FIG. 6 is an equation for determining the bits for another coordinate that corresponds to the sine of the latitude coordinate for a mobile device;

FIG. 7 is another equation for determining the latitude coordinate for a mobile device from another coordinate that corresponds to the sine of the latitude coordinate;

FIG. 8 is a table that compares the resolution for available geographical addresses at different latitudes of the Earth to other geographical addresses that are generated from other coordinates, which correspond to the sine of the latitude coordinates; and FIG. 9 is a data structure for an exemplary geographical address, in accordance with the invention.

DETAILED DESCRIPTION OF THE PREFERRED EMBODIMENT

Figure 1A:
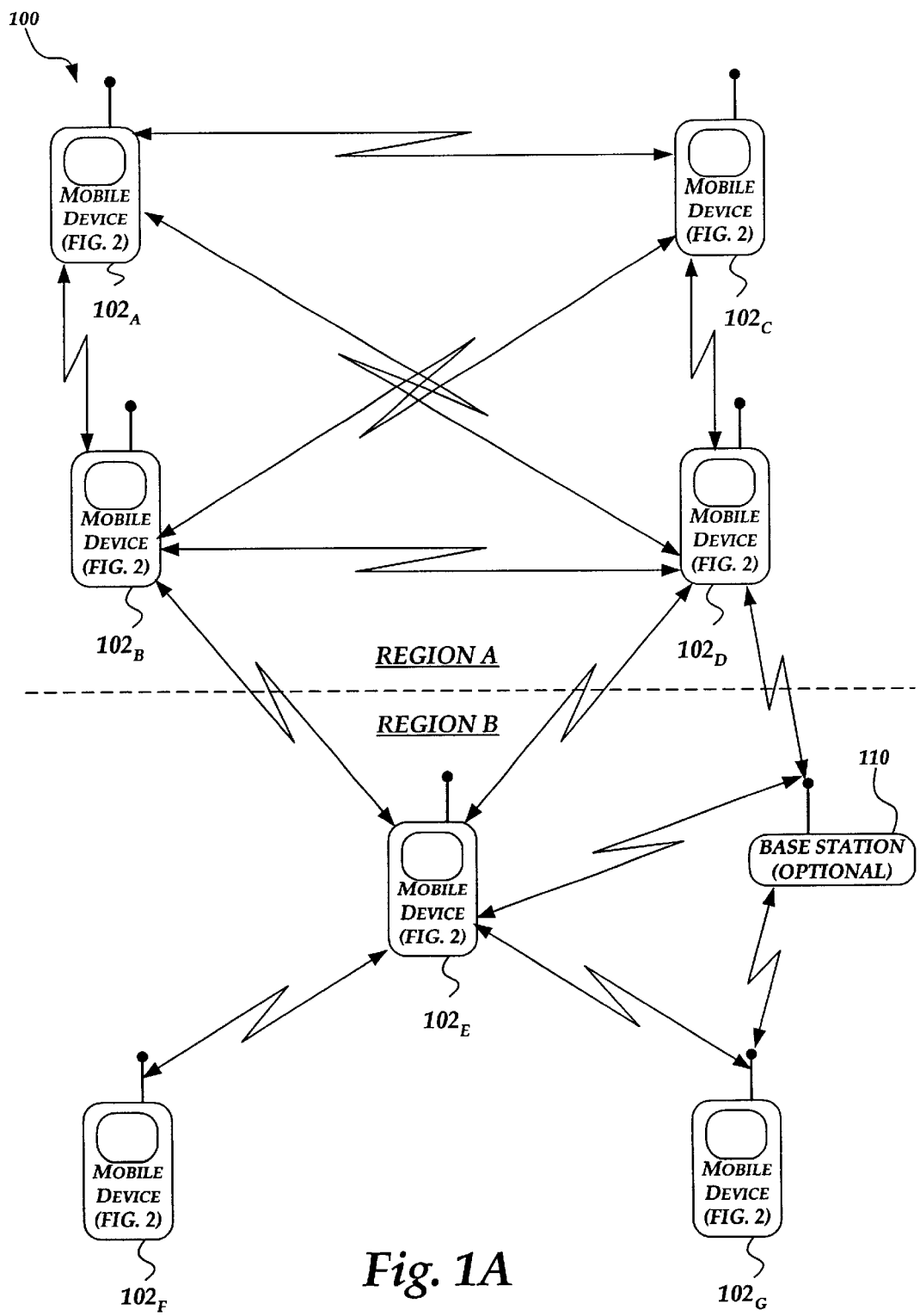
FIG. 1A is a block diagram that illustrates several mobile devices disposed in different regions of a mesh network.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise. The meaning of "a", "an," and "the" include plural references. The meaning of "in" includes "in" and "on." Referring to the drawings, like numbers indicate like parts throughout the views. Additionally, a reference to the singular includes a reference to the plural unless otherwise stated or is inconsistent with the disclosure herein.

The term "user" refers to any person or customer such as a business or organization that employs a mobile device to communicate or access resources over a mobile network. The term "operator" refers to any technician or organization that maintains or services an IP packet based network. The term "geographical address" refers to an address associated with the particular physical location of a mobile device in a mesh network. The geographical addresses enable mobile devices to forward and route communications between each other over the mesh network. A geographical address can include an IP address, degrees of latitude and longitude, or any other information that can be used to physically identify the location of the mobile device on the Earth.

The term "mesh network" refers to a routed wireless network architecture, which substantially mirrors the operation of a wired network. Each mobile device can operate as a router and forward communications between distant mobile devices that are coupled to the mesh network. Each mobile device is a part of the mesh network infrastructure, which grows as the number of mobile devices on the network increases. Since each mobile device is capable of routing/forwarding communications to another mobile device that is closer to the final destination on the mesh network (distant mobile device), multiple hop wireless communications can be made between mobile devices that are separated by relatively large geographical distances and/or structures without having to operate over a wired network. Additionally, in a mesh network, each mobile device may directly communicate with another mobile device when they are in range of their wireless transceivers.

The term "base station" refers to a relatively stationary wireless network device that can forward/route communications between distant mobile devices that are part of the same or another mesh network. Also, the base station can enable mobile devices to communicate with resources accessible on a wired network that is coupled to the base station. The base station may communicate wirelessly with other base stations and may enable the forwarding of mobile device communications over a wired network. The base station can perform handover management and various measurements such as triangulating the location of a mobile device. The base station may support one or more methods for determining the location of a mobile device including Enhanced Observed Time Difference (E-OTD), Cell Identifier (CI) or Service Area Identifier (SAI) and Enhanced Timing Advance (ETA) and Base Station Subsystem (BSS) information. Other locating systems may be supported by the base station, e.g., Global Positioning System (GPS) and Assisted Global Positioning System (AGPS).

The invention provides a method and system for increasing the number of available geographical addresses for mobile devices in regions of the Earth nearer to the equator than those regions closer to the North and South poles and without significantly increasing the size (number of bits) of the addresses. Typically, regions nearer to the equator have higher populations and a greater need for large amounts of geographical addresses than those regions found closer to the South and North poles.

By using the sine of a latitude coordinate for a particular location instead of the actual latitude coordinate, the number of geographical addresses in the most densely populated regions on Earth can be significantly increased while decreasing the number of addresses available in regions closer to the South or North poles. For example, when a geographical address at the equator uses 30 bits for the sine of the latitude coordinate and 31 bits for the longitude coordinate, 57% more geographical addresses are available at the equator than a similar sized geographical address that includes the same number of bits for the latitude coordinate instead of the sine of the latitude coordinate. Generally, in regions 50 degrees of latitude or less from the equator (North or South), the invention makes more geographical addresses available than those regions that are closer to the poles.

Geographical addresses can be used in wireless mesh networks to enable the forwarding and routing of communications between mobile devices. In other embodiments, the invention may be used to provide geographical addresses for non-mobile network devices such as routers, gateways, servers and personal computers. Any combination of mobile and non-mobile devices can use the geographical addresses to forward/route communications over a network. Also, in other embodiments, other functions may operate on the latitude coordinate and/or longitudinal coordinate to further increase the number of geographical addresses available in densely populated regions and/or reduce the size of the addresses.

Figure 2:
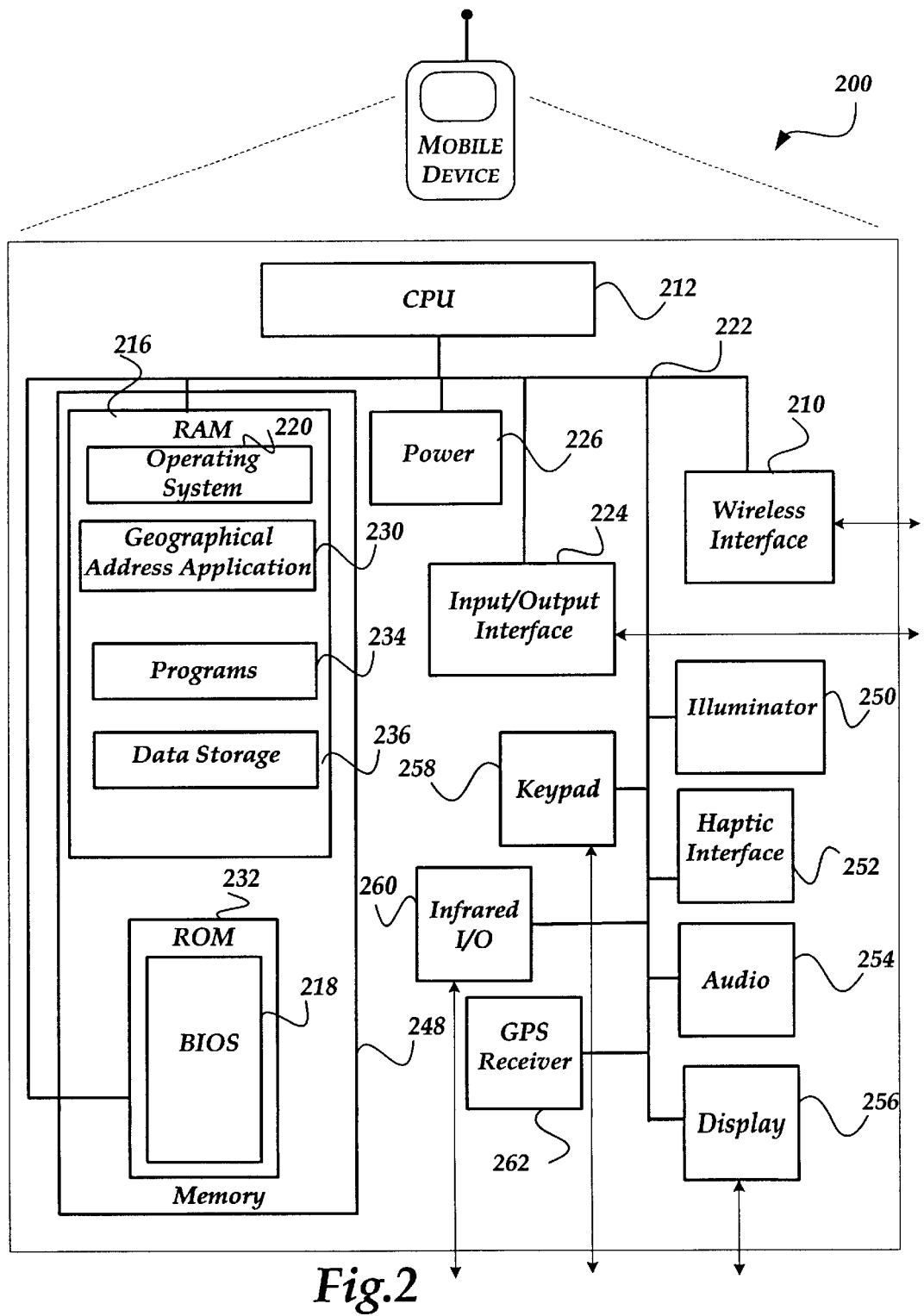
FIG. 2 is a schematic diagram that illustrates components that can be included in a mobile device.

Referring briefly to FIG. 2, the invention further includes a computer readable medium. The computer readable medium includes computer-executable instructions for generating geographical addresses for mobile devices disposed on the surface of the Earth.

The instructions in the computer readable medium comprise determining at least a latitude coordinate and a longitude coordinate for a geographical position of a mobile device.

The instructions in the computer readable medium further comprise determining another coordinate that corresponds to the latitude coordinate of the mobile device, and wherein the determining of the other coordinate increases the number of other coordinates that correspond to the latitude coordinate and are relatively the same size as the latitude coordinates for the mobile device in at least one region of the Earth.

The instructions in the computer readable medium further comprise generating a geographical address for the mobile device based on the other coordinate and the longitude coordinate, wherein employing the determined coordinate and longitude coordinate to generate each geographical address for the mobile device enables a substantially greater range of available geographical addresses to be generated for each mobile device disposed in the at least one region of the Earth than at least another region of the Earth of relatively the same size that is closer to one of the North and South poles than the Equator.

FIG. 1A illustrates an overview 100 of a mesh network that includes several mobile devices $102_{A-G}$. The available wireless communication paths between each of the mobile devices are shown. For example, in region A, mobile devices $102_{A-D}$ can directly communicate with each other. Also, mobile devices $102_{B,D}$ can communicate with mobile device $102_E$ in region B. In region B, mobile devices $102_{F,G}$ can communicate with mobile device $102_E$. Also, in region B, base station 110 can communicate with mobile devices $102_{F,G}$ and mobile device $102_D$ in region A. Although not shown, base station 110 may be coupled to a radio access network (RAN) that enables mobile devices $102_{A-G}$ to communicate with other resources, non-mobile devices and mobile devices that are coupled to another wireless network or a wired network. Different factors can affect the ability of wireless communications between and within regions, e.g., relatively long geographical distances and physical structures can adversely effect communications between mobile devices.

Figure 1B:
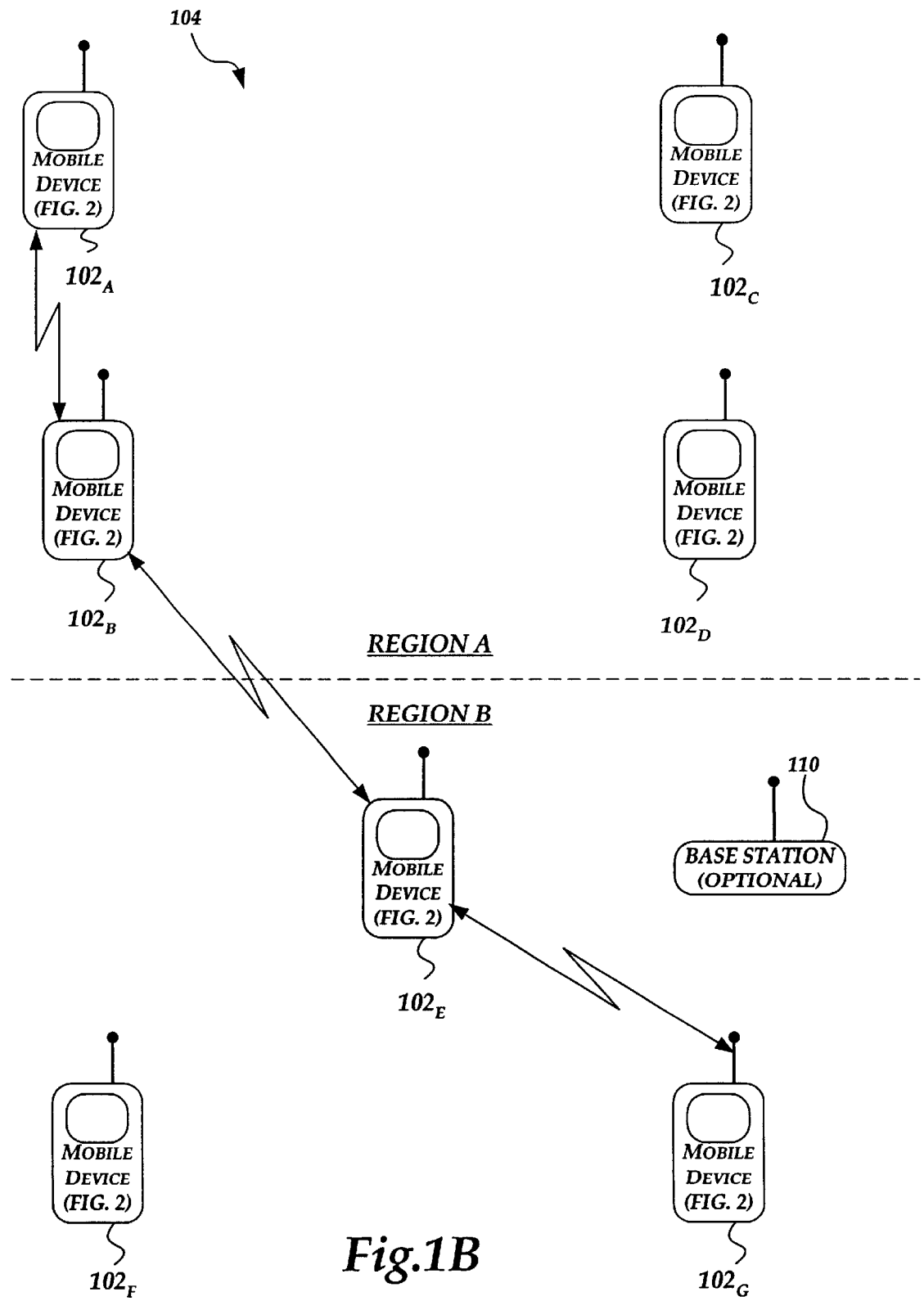
FIG. 1B is a block diagram that shows a communication path between two mobile devices in different regions of the mesh network.

FIG. 1B is an overview 104 of an exemplary communication path in a mesh network between mobile device $102_A$ in region A and mobile device $102_G$ in region B. Mobile devices $102_{B,E}$ provide the communication path by forwarding communications back and forth between relatively distant mobile devices $102_{A,G}$. The geographical addresses of the communicating mobile devices $102_{A,G}$ are employed by the other mobile devices in the mesh network to establish an available communication path between the "callee" and "caller" mobile devices.

FIG. 2 shows an exemplary mobile device 200, according to one embodiment of the invention. In one embodiment, mobile device 200 is a cellular telephone that is arranged to send and receive voice communications and messages such as Short Messaging Service (SMS) messages. Generally, mobile device 200 may include any device capable of connecting to a wireless network such as a mesh network. Such devices include cellular telephones, smart phones, pagers, radio frequency (RF) tancedevices, infrared (IR) devices, integrated devices combining one or more of the preceding devices, and the like. Mobile device 200 may also include other devices that have a wireless interface such as Personal Digital Assistants (PDAs), handheld computers, personal computers, multiprocessor systems, microprocessor-based or programmable consumer electronics, network PCs, wearable computers, and the like.

Mobile device 200 may include many more components than those shown in FIG. 2. However, the components shown are sufficient to disclose an illustrative embodiment for practicing the present invention. As shown in the figure, mobile device 200 includes processing unit 212, memory 248, RAM 216, ROM 232, operating system 220, geographical address application 230, programs 234, data storage 236, bios 218, power 226, input/output interface 224, wireless interface unit 210, illuminator 250, haptic interface 252, audio 254, display 256, keypad 258, infrared input/output 260, global positioning systems (GPS) receiver 262.

Mobile device 200 may optionally communicate with base station 110, or directly with another mobile device, via wireless interface unit 210. Wireless interface unit 210 includes circuitry for coupling mobile device 200 to a mesh network, and is constructed for use with various communication protocols including, but not limited to, UDP, TCP/IP, SMS, GPRS, Wireless Application Protocol (WAP) and the like.

Mass memory 248 generally includes RAM 216, ROM 232, and one or more data storage units 236. The mass memory stores operating system 220 for controlling the operation of mobile device 200. It will be appreciated that this component may include a general purpose operating system such as a version of UNIX or LINUX™, or a specialized mobile communication operating system such as the Symbian® operating system. Basic input/output system ("BIOS") 218 is also provided for controlling the low-level operation of mobile device 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores application code and data used by mobile device 200. More specifically, the mass memory stores geographical address application 230, and programs 234. Geographical address application 230 may be loaded into memory 248 and run under control of operating system 220. Also, programs 234 may include computer executable instructions which, when executed by mobile device 200, transmit and receive WWW pages, e-mail, audio, video, and enable telecommunication with another user of another mobile device.

Mobile device 200 also comprises input/output interface 224 for communicating with external devices, such as a headset, or other input or output devices not shown in FIG. 2. Data storage 236 can be utilized by mobile device 200 to store, among other things, programs 234, geographical address application 230, databases and/or libraries of images, lists and other data. Keypad 258 may be any input device arranged to receive input from a user. For example, keypad 258 may include a push button numeric dial, or a keyboard. Keypad 258 may also include command buttons that are associated with selecting and sending images. Display 256 may be a liquid crystal display (LCD), gas plasma, light emitting diode (LED), or any other type of display used with a mobile device. Display 256 may also include a touch sensitive screen arranged to receive input from an object such as a stylus or a digit from a human hand. Additionally, infrared input/output 260 may be used to send and receive infrared commands to/from other devices.

Power supply 226 provides power to mobile device 200. A rechargeable or non-rechargeable battery may be used to provide power. The power may also be provided by an external power source, such as an AC adapter or a powered docking cradle that supplements and/or recharges a battery.

As shown, mobile device 200 includes illuminator 250, haptic interface 252, and audio interface 254. Illuminator 250 may remain active for specific periods of time or in response to events. For example, when illuminator 250 is active, it may backlight the buttons on keypad 259 and stay on while the mobile device is powered. Also, illuminator 250 may backlight these buttons in various patterns when particular actions are performed, such as dialing another mobile device. Illuminator 250 may also cause light sources positioned within a transparent or translucent case of the mobile device to illuminate in response to actions.

Audio interface 254 is arranged to produce and receive audio signals such as the sound of a human voice. For example, audio interface 254 may be coupled to a speaker and microphone (not shown) to enable telecommunication with others and/or generate an audio acknowledgement for some action. Haptic interface 252 is arranged to provide sensory feedback to a user of the mobile device. For example, the haptic interface may be employed to vibrate mobile device 400 in a particular way when another user of a mobile device is calling.

GPS receiver 262 can determine the physical coordinates of mobile device 200 on the surface of the Earth, which is presented to geographical address program 230 in longitude and latitude coordinates. These coordinates can include latitude, longitude and altitude. GPS is operated by the United States Department of Defense to provide worldwide navigation, position location, and precision timing services. GPS comprises a global network of satellites that interact with GPS receiver 262, allowing geographical address application 230 to precisely determine the location of mobile device 200. This location is typically output from GPS receiver 262 as latitude and longitude values.

GPS receiver 262 can also employ other geo-positioning mechanisms, including, but not limited to, triangulation, assisted GPS (AGPS), E-OTD, CI, SAI, ETA, BSS and the like, to further determine the physical location of mobile device 200 on the surface of the Earth. It is understood that under different conditions, GPS receiver 262 can determine a physical location within millimeters for mobile device 200; and in other cases, the determined physical location may be less precise, such as within a meter or significantly greater distances.

Figure 3A:
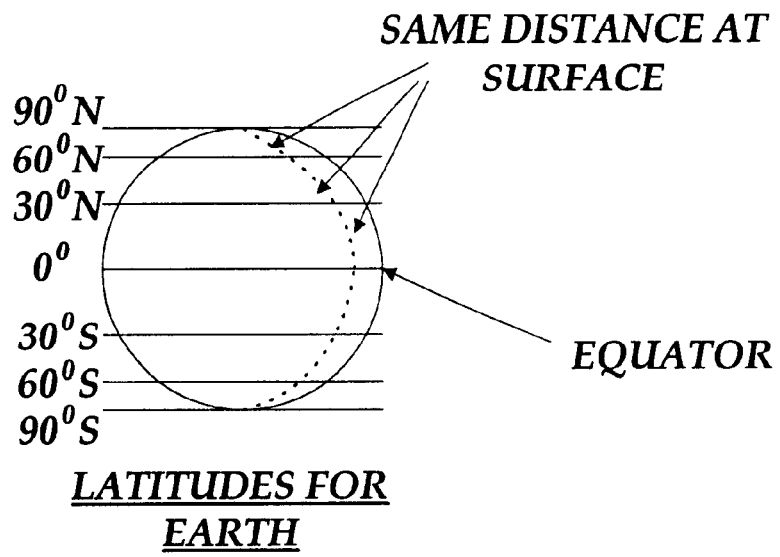
FIG. 3A is an overview diagram that shows the distribution of selected latitude coordinates across the surface of the Earth.

FIG. 3A is a diagram that illustrates the arrangement of several degrees of latitude on the surface of the Earth. As shown, the lines of latitude (0, 30, 60 and 90 degrees) get gradually closer together as they progress from the equator towards the North and South poles. However, because the surface of the Earth bends towards the poles, the lines of latitude are equidistant at the surface of the Earth. Thus, an object moving a certain distance northward in a region near the North pole would cross the same number of lines of latitude than another object moving the same distance in a region nearer to the equator.

Figure 3B:
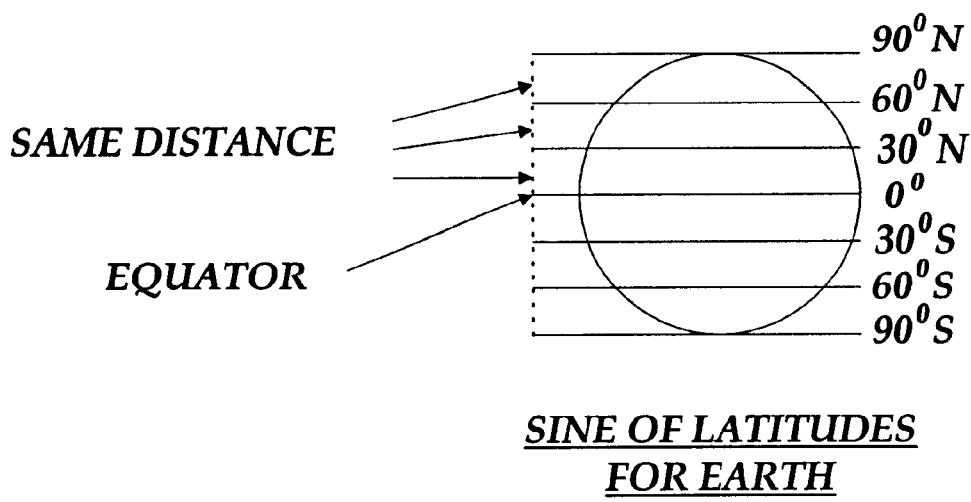
FIG. 3B is another overview diagram that illustrates the distribution of the sine of selected latitude coordinates across the surface of the Earth.

FIG. 3B is another diagram that illustrates the arrangement of the sines of several degrees of latitude on the surface of the Earth. As shown, the sines of the lines of latitude (0, 30, 60 and 90 degrees) are equidistant from each other as they progress from the equator towards the North and South poles. However, because the surface of the Earth bends towards the poles, the sines of the lines of latitude are closer to each others near the equator than near the poles at the surface of the Earth. Thus, an object moving a certain distance northward in a region near the North pole would cross the same number of lines of sines of latitude than another object moving a much shorter distance in a region nearer to the equator.

Figure 4:
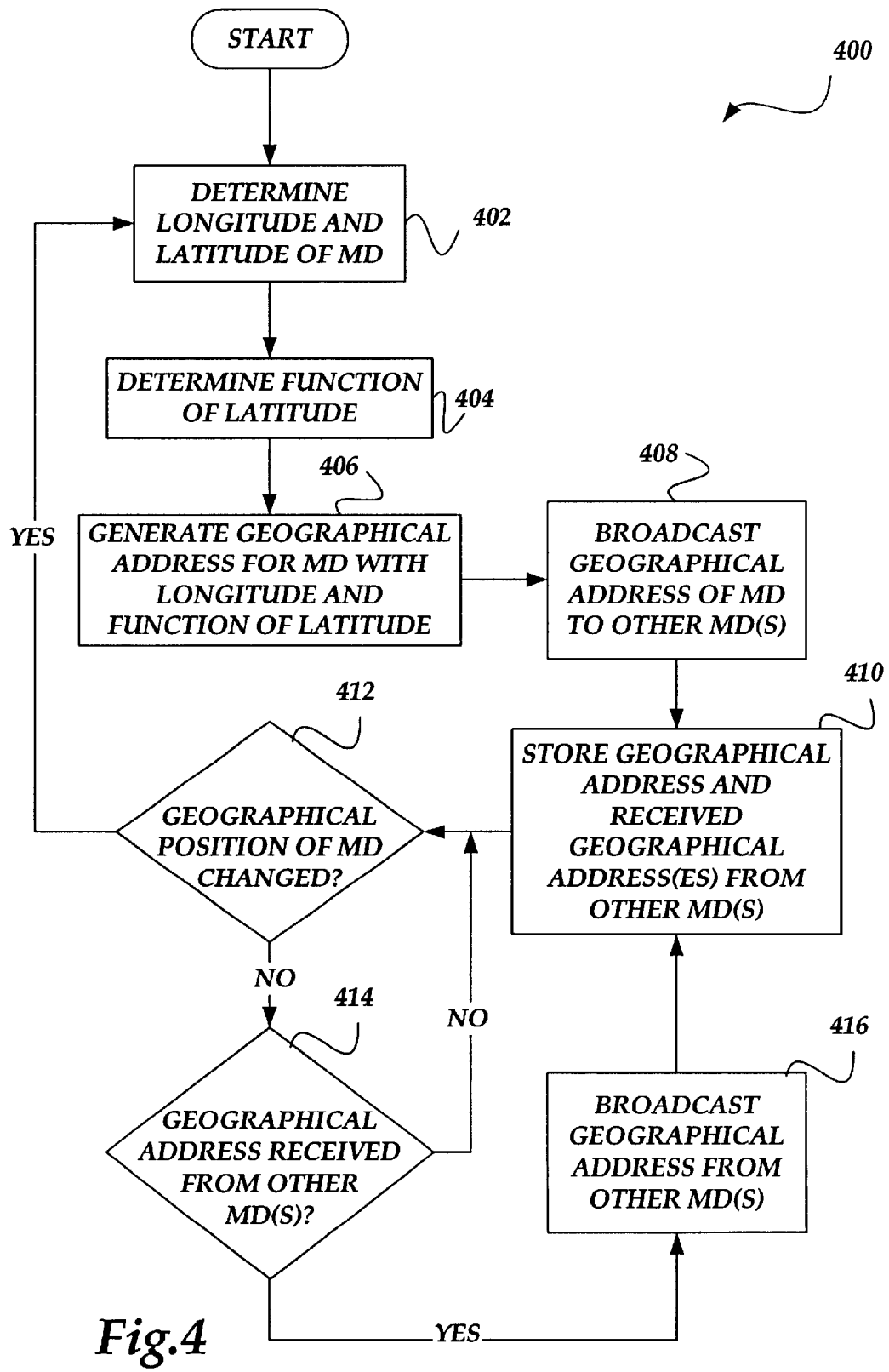
FIG. 4 is a flow chart that shows the generation and distribution of geographical addresses for mobile devices on a network.

FIG. 4 is a flow chart that shows an overview 400 of the actions for generating a geographical address. Moving from a start block, the process advances to a block 402 where at least the latitude and longitude coordinates for a mobile device (MD) are determined. Although not shown, the altitude coordinate may also be determined. Next, the process flows to a block 404 where a function of the latitude coordinate is determined. In one embodiment, the sine function is determined for the latitude coordinate. In another embodiment, a table is used to look up a predetermined sine of the latitude coordinate. In yet another embodiment, at least one other function may be performed on the latitude coordinate and/or the longitudinal coordinate, including but not limited to, a compression function and/or a redistribution function. These functions are employed, at least in part, to increase the number of geographical addresses available in selected regions on the surface of the Earth without significantly increasing the size of each geographical address.

Next, the process steps to a block 406 where the geographical address for the mobile device is generated. The geographical address includes bits for both the function of the latitude coordinate and the longitudinal coordinate. An exemplary geographical address is shown in FIG. 9, which is discussed in greater detail below. At block 408, the geographical address of the mobile device is broadcast to other mobile devices on the mesh network. At block 412, the mobile device stores its geographical address in a data store. Also, the mobile device stores other geographical addresses that it has received from other mobile devices on the mesh network.

The process moves to decision block 412 to determine whether the current geographical location of the mobile device has changed. If true, the process jumps back to block 402 and repeats substantially the same actions discussed above. However, when the determination is false, the process moves to decision block 414 where a determination is made as to whether other geographical addresses have been received from other mobile devices on the mesh network. If false, the process loops back to decision block 412 and repeats substantially the same actions discussed above. However, when the determination at decision block 414 is affirmative, the process advances to block 416 where other geographical addresses received from other mobile devices are broadcast by the mobile device. Next, the process returns to block 410 and performs substantially the same actions as discussed above.

Figure 5:
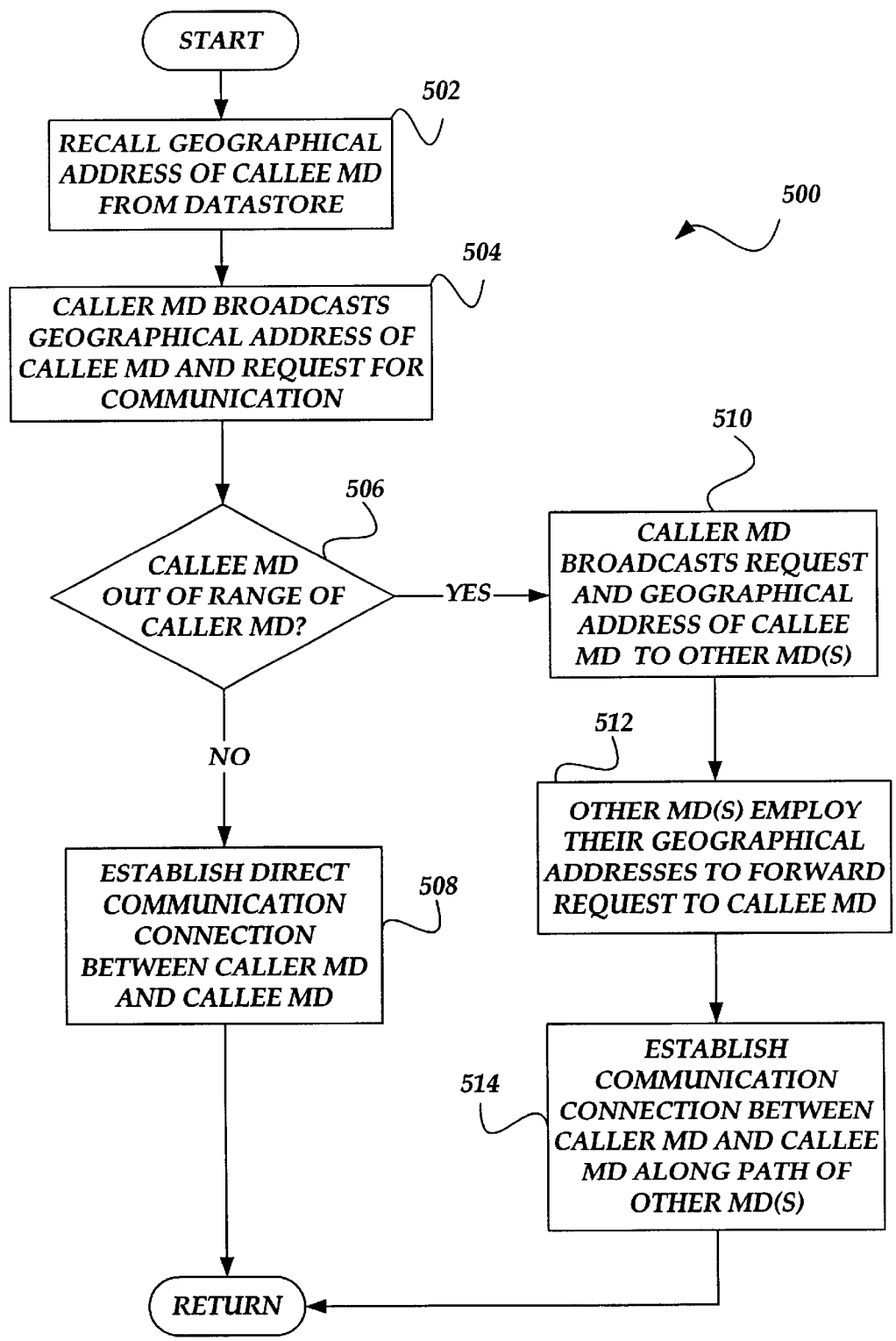
FIG. 5 is a flow chart that illustrates communication between two mobile devices that have geographical addresses.

FIG. 5 illustrates an overview 500 of the actions for establishing communications over a mesh network between a caller mobile device (MD) and a callee mobile device (MD) that may be distant from each other. Moving from a start block, the process advances to a block 502 where the geographical address of the callee mobile device is retrieved from a data store. In one embodiment, the data store is included in the mobile device; and in another embodiment, the data store is disposed in another location that is accessible over the mesh network. For example the data store may be located at another mobile device, a base station or server that is coupled to the mesh network in some manner.

At block 504, the caller mobile device broadcasts the geographical address of the callee mobile device and a request to communicate with the callee mobile device. Moving to decision block 506, a determination is made as to whether or not the callee mobile device is out of range of direct wireless communication with the caller mobile device. If within range, the process flows to block 508 where the caller mobile device and the callee mobile device establish a communication connection between each other for the period of time that communication takes place. Next, the process returns to performing other actions.

Alternatively, at decision block 506, when it is determined that the callee mobile device is out of range of the caller mobile device, the process steps to block 510. The caller mobile device broadcasts the request to communicate and the geographical address of the callee mobile device to other mobile devices on the mesh network. At block 512, other mobile devices that are physically closer to the callee mobile device than the caller mobile device, forward (rebroadcast) the geographical address of the callee mobile device and the request for communication. This forwarding action by other mobile devices enables the callee mobile device to eventually receive the request for communication from the caller mobile device.

The process moves to block 514, where the caller and callee mobile device establish a communication connection between each other and communicate until one mobile device ends the communication connection. The path for the communication connection is established in part by the forwarding action of the other mobile devices located between the callee and caller mobile devices. Next, the process returns to processing other actions.

Although the specification discusses the use of the invention mainly in wireless mesh networks, it is understood that the invention may also be used in any other type of wireless or wired network that employs geographical addresses for devices coupled to a network.

FIG. 6 is an exemplary equation for determining the sine of the latitude coordinate in bit format for inclusion in a geographical address. The variable "latitude" represents the latitude coordinate. The "x" variable represents the number of bits reserved for a determined sine of the latitude coordinate in the geographical address and the "latitude bits" variable is the bit-wise representation of the sine of the latitude coordinate.

FIG. 7 is an exemplary equation for determining a latitude coordinate from the bit-wise representation of the sine of the latitude coordinate as calculated from the equation shown in FIG. 6. The variables in FIG. 7 are substantially the same variables as discussed above for FIG. 6.

FIG. 8 is a table that compares the resolution for a physical location when employing the same longitude coordinate and either the sine of a latitude coordinate or the actual latitude coordinate. In this table, the latitude coordinate and the sine of the latitude coordinate are both limited to 30 bits of precision in a geographical address. From the entries in the table, it is apparent that physical locations are more resolved (greater precision) when the sine function is performed on smaller latitude coordinates (closer to the equator) and less resolved (less precise) when performed on larger latitude coordinates (closer to either pole). The table also shows that more precise geographical addresses (with 30 bits for the sine of the latitude and 31 bits for longitude) are available at latitudes less than 50 degrees.

FIG. 9 is a data structure that illustrates an exemplary geographical address that includes fields for the hemispheres (North or South hemispheres can be indicated with one bit), sine of the latitude coordinate and longitude coordinate. Although not shown, the geographical address could also include other fields including an altitude coordinate, altitude precision, vertical precision, horizontal precision, length of the address, lengths of the individual fields, version and checksum. Although not shown, the exemplary geographical address may be employed by an IP packet based domain name system (DNS) for forwarding communications between distant mobile and non-mobile devices over various types of networks.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for generating geographical addresses for mobile devices disposed on the surface of the Earth, comprising:

(a) determining at least a latitude coordinate and a longitude coordinate for a geographical position of a mobile device;

(b) determining at least one other coordinate that corresponds to the latitude coordinate of the mobile device, wherein the determining of the at least one other coordinate increases a resolution of the latitude coordinate and wherein a binary representation of the at least one other coordinate is-relatively the same size as a binary representation of the latitude coordinate for locating the mobile device in at least one region of the Earth; and (c) generating a geographical address for the mobile device that includes the at least one other coordinate and the longitude coordinate wherein including the at least one other coordinate and longitude coordinate in the geographical address for the mobile device enables a substantially greater range of available geographical addresses to be generated for each mobile device disposed in the at least one region of the Earth than at least another region of the Earth of relatively the same size that is closer to one of the North and South poles than the Equator.

2. The method of claim 1, further comprising:
(a) determining an altitude coordinate for the geographical position of the mobile device; and
(b) employing the altitude coordinate to generate the geographical address of the mobile device.

3. The method of claim 1, subparagraph (a), wherein the determining of the latitude coordinate and the longitude coordinate employs at least one of Assisted Global Positioning System, Global Positioning System, Enhanced Observed Time Difference, Cell Identifier, Service Area Identifier, Timing Advance, Base Station Subsystem and triangulation.

4. The method of claim 1, subparagraph (b), wherein determining the at least one other coordinate is the result of performing a sine function on the latitude coordinate.

5. The method of claim 4, wherein the at least one other coordinate is determinable with at least one equation, including latitudebits $=(2^x-1)/\sin(\text{latitude})$,
wherein x represents the number of bits reserved for the determined sine of the latitude coordinate in the geographical address, latitudebits represents the other coordinate and latitude represents the latitude coordinate.

6. The method of claim 1, subparagraph (b), wherein determining the at least one other coordinate includes accessing a table of other coordinates that are predetermined and correspond to latitude coordinates, wherein each predetermined other coordinate corresponds to each longitude coordinate that is determinable in at least one region of the Earth.

7. The method of claim 1, further comprising employing the geographical address for the mobile device and another geographical address for another mobile device to establish communication between the mobile device and the other mobile device over a network.

8. The method of claim 7, further comprising enabling each mobile device on the network to forward a request for communication between the mobile device and the other mobile device along a path that includes at least one other mobile device on the network.

9. The method of claim 8, further comprising employing at least one geographical address of at least one other mobile device to determine the path between the mobile device and the other mobile device.

10. The method of claim 8, wherein communication is established between the mobile device and the other mobile device by at least one other mobile device operating as a router disposed on the path between the mobile device and the other mobile device.

11. The method of claim 1, further comprising storing geographical addresses of each mobile device in a data store.

12. The method of claim 11, wherein the data store is disposed in at least one mobile device.

13. The method of claim 11, wherein the data store is disposed in at least one server accessible through a base station in communication with at least one mobile device on the network.

14. A computer readable medium including computer-executable instructions for generating geographical addresses for mobile devices disposed on the surface of the Earth, the instructions causing a computer to perform a plurality of actions comprising:
(a) determining at least a latitude coordinate and a longitude coordinate for a geographical position of a mobile device;
(b) determining at least one other coordinate that corresponds to the latitude coordinate of the mobile device, wherein the determining of the at least one other coordinate increases a resolution of the latitude coordinate and wherein a binary representation of the at least one other coordinate is relatively the same size as a binary representation of the latitude coordinate for locating the mobile device in at least one region of the Earth; and
(c) generating a geographical address for the mobile device based on the at least one other coordinate and the longitude coordinate, wherein employing the at least one other coordinate and the longitude coordinate to generate the geographical address for the mobile device enables a substantially greater range of available geographical addresses to be generated for each mobile device disposed in the at least one region of the Earth than at least another region of the Earth of relatively the same size that is closer to one of the North and South poles than the Equator.

15. A system for generating geographical addresses for mobile devices disposed in a network on the surface of the Earth, comprising
(a) a geographic module that determines at least a latitude coordinate and a longitude coordinate for a geographical position of a mobile device;
(b) a transform module that determines at least one other coordinate that corresponds to the latitude coordinate of the mobile device, wherein the determining of the at least one other coordinate increases a resolution of the latitude coordinate and wherein a binary representation of the at least one other coordinate is relatively the same size as a binary representation of the latitude coordinate for locating the mobile device in at least one region of the Earth; and
(c) an address module that generates a geographical address for the mobile device based on the at least one other coordinate and the longitude coordinate, wherein employing the at least one other coordinate and the longitude coordinate to generate the geographical address for the mobile device enables a substantially greater range of available geographical addresses to be generated for each mobile device disposed in the at least one region of the Earth than at least another region of the Earth of relatively the same size that is closer to one of the North and South poles than the Equator.

16. The system of claim 15, subparagraph (a), wherein the geographic module further employs at least one of Assisted Global Positioning System, Global Positioning System, Enhanced Observed Time Difference, Cell Identifier, Service Area Identifier, Timing Advance, Base Station Subsystem and triangulation to determine the latitude coordinate and the longitude coordinate of the mobile device.

17. The system of claim 15 subparagraph (b), wherein the transform module employs a sine function to determine the at least one other coordinate from the latitude coordinate.

18. A system for generating geographical addresses for mobile devices disposed on the surface of the Earth, comprising
(a) means for determining at least a latitude coordinate and a longitude coordinate for a geographical position of a mobile device;
(b) means for determining at least one other coordinate that corresponds to the latitude coordinate of the mobile device, wherein the determining of the at least one other coordinate increases a resolution of the latitude coordinate and wherein a binary representation of the at least one other coordinate is relatively the same size as a binary representation of the latitude coordinate for locating the mobile device in at least one region of the Earth; and (c) means for generating a geographical address for the mobile device based on the at least one other coordinate and the longitude coordinate, wherein employing the at least one other coordinate and the longitude coordinate to generate the geographical address for the mobile device enables a substantially greater range of available geographical addresses to be generated for each mobile device disposed in the at least one region of the Earth than at least another region of the Earth of relatively the same size that is closer to one of the North and South poles than the Equator.

* * * * *